(12) United States Patent
Nakajo

(10) Patent No.: US 6,474,865 B2
(45) Date of Patent: Nov. 5, 2002

(54) RADIATION IMAGE PICKUP APPARATUS

(75) Inventor: Masakazu Nakajo, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/795,517

(22) Filed: Mar. 1, 2001

(65) Prior Publication Data

US 2001/0019602 A1 Sep. 6, 2001

(30) Foreign Application Priority Data

Mar. 1, 2000 (JP) .......................................... 2000-056431

(51) Int. Cl.[7] ................................................ A61B 6/04
(52) U.S. Cl. ............................. 378/209; 5/600; 378/114
(58) Field of Search .................................. 378/208, 209, 378/205, 114; 5/600, 601

(56) References Cited

U.S. PATENT DOCUMENTS 5,983,425 A  * 11/1999  DiMucci et al. ................ 5/600
6,320,510 B2 * 11/2001  Menkedick et al. ........ 340/562

* cited by examiner

*Primary Examiner*—David P. Porta
(74) *Attorney, Agent, or Firm*—Sughrue Mion, PLLC

(57) ABSTRACT

An imaging bed has a horizontally movable top panel for placing a subject to be imaged thereon, a touch switch mounted on the top panel for unlocking the top panel from a lock unit, and a protective cover positioned outwardly of the touch switch and tiltable toward and away from the top panel. The protective cover is engageable with the top panel in covering relation to the touch switch for preventing a finger from touching the touch switch when the protective cover is tilted toward the touch switch under external forces. The imaging bed is protected from an unwanted release from a fixed position, and can efficiently be operated.

8 Claims, 9 Drawing Sheets

RADIATION IMAGE PICKUP APPARATUS

BACKGROUND OF THE INVENTION

1. Field of the Invention

The present invention relates to a radiation image pickup apparatus for capturing a radiation image of a subject.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display device such as a CRT or the like.

When a radiation energy such as X-rays, α-rays, γ-rays, electron beams, ultraviolet radiation, or the like is applied to a certain phosphor, it stores part of the applied radiation energy. When stimulating light such as visible light is subsequently applied to the phosphor, the phosphor emits light depending the stored radiation energy. Such a phosphor is referred to as a stimulable phosphor. A stimulable phosphor is usually used in the form of a sheet which is referred to as a stimulable phosphor sheet, for the ease with which it can be handled.

The above known system comprises a built-in radiation image information reading apparatus which includes a recording section for temporarily recording radiation image information of a subject on a stimulable phosphor sheet, a reading section for photoelectrically reading the radiation image information recorded on the stimulable phosphor sheet by applying simulating light to the stimulable phosphor sheet, and an erasing section for erasing remaining radiation image information from the stimulable phosphor sheet after the recorded image information has been read, the stimulable phosphor sheet being circulated or moved back and forth in the apparatus.

One known type of the radiation image information reading apparatus has an imaging bed that is horizontally movable. For example, as shown in FIG. 9 of the accompanying drawings, a conventional radiation image information reading apparatus 1 has a housing 2 and an imaging bed 3 floatingly supported on the top of the housing 2 for movement along two horizontal axes, i.e., X- and Y-axes. A patient 4, who is a subject to be imaged, lies on the imaging bed 3, with the back down, as shown, or one side down.

The operator 5 moves the imaging bed 3 along the X-axis or the Y-axis to bring a desired imaging area of the patient 4 into registration with the X-ray applying position of an X-ray radiating unit 6. Then, the operator 5 energizes the X-ray radiating unit 6 to capture radiation image information of the desired imaging area of the patient 4.

The radiation image information reading apparatus 1 has a lock mechanism for locking the imaging bed 3 at a desired vertical position. For moving the imaging bed 3, the operator 5 presses an unlock switch 7 on one side of the imaging bed 3 to cause the lock mechanism to release the imaging bed 3.

However, since the unlock switch 7 is positioned on one side of the imaging bed 3, the patient 4 may inadvertently press the unlock switch 7 when the patient 4 climbs on or off the imaging bed 3. When the patient 4 inadvertently presses the unlock switch 7, the imaging bed 3 can be moved undesirably because it is released from the lock mechanism. One solution is to position the unlock switch 7 remotely from the imaging bed 3. However, the operator 5 finds it awkward to press the remotely positioned unlock switch 7 in order to lock and unlock the imaging bed 3.

SUMMARY OF THE INVENTION

It is therefore an object of the present invention to provide a radiation image pickup apparatus which prevents an imaging bed from being inadvertently unlocked and allows the operator to operate the imaging bed efficiently.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
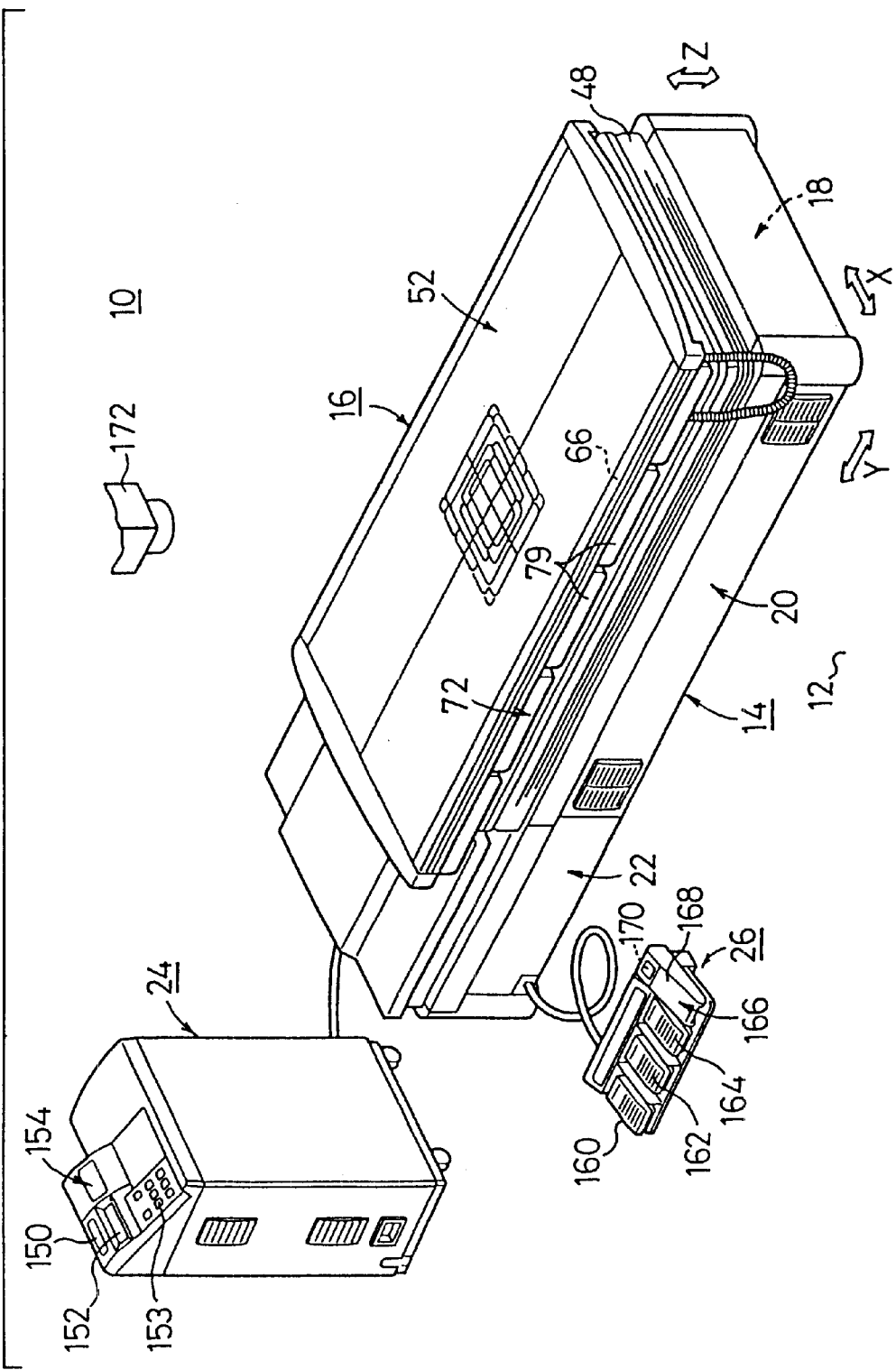
FIG. 1 is a perspective view of a radiation image pick-up apparatus according to the present invention.
Figure 2:
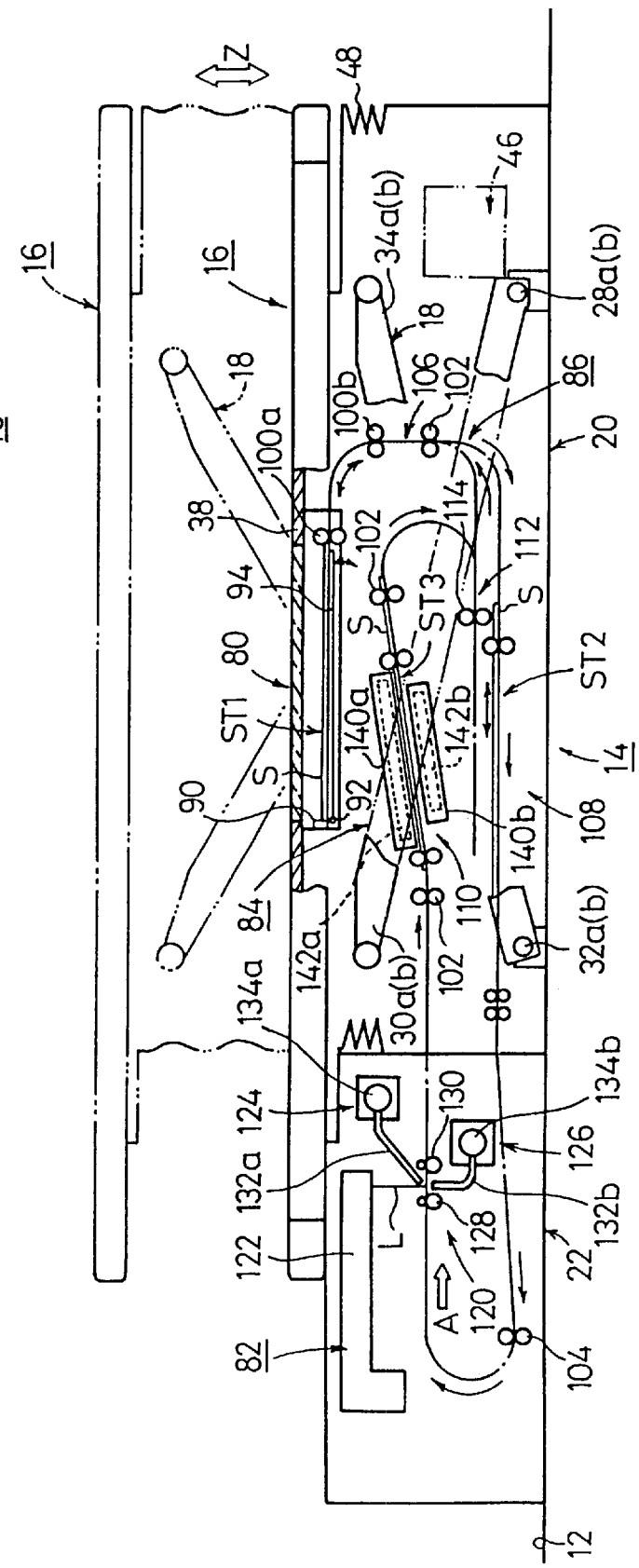
FIG. 2 is a schematic side elevational view showing an internal structure of the radiation image pickup apparatus.

As shown in FIGS. 1 and 2, a radiation image information reading apparatus 10, which serves as a radiation image pickup apparatus according to the present invention, comprises a housing 14 placed on a floor or installation surface 12, an imaging bed 16 for supporting a patient, with the back or one side down, directly thereon, and a lifting/lowering mechanism 18 for lifting and lowering the imaging bed 16 with respect to the housing 14. The housing 14 comprises a first casing 20 housing the lifting/lowering mechanism 18 therein and a second casing 22 separate from and adjacent to the first casing 20. A controller 24 and a switch unit 26 are connected to the second casing 22.

Figure 3:
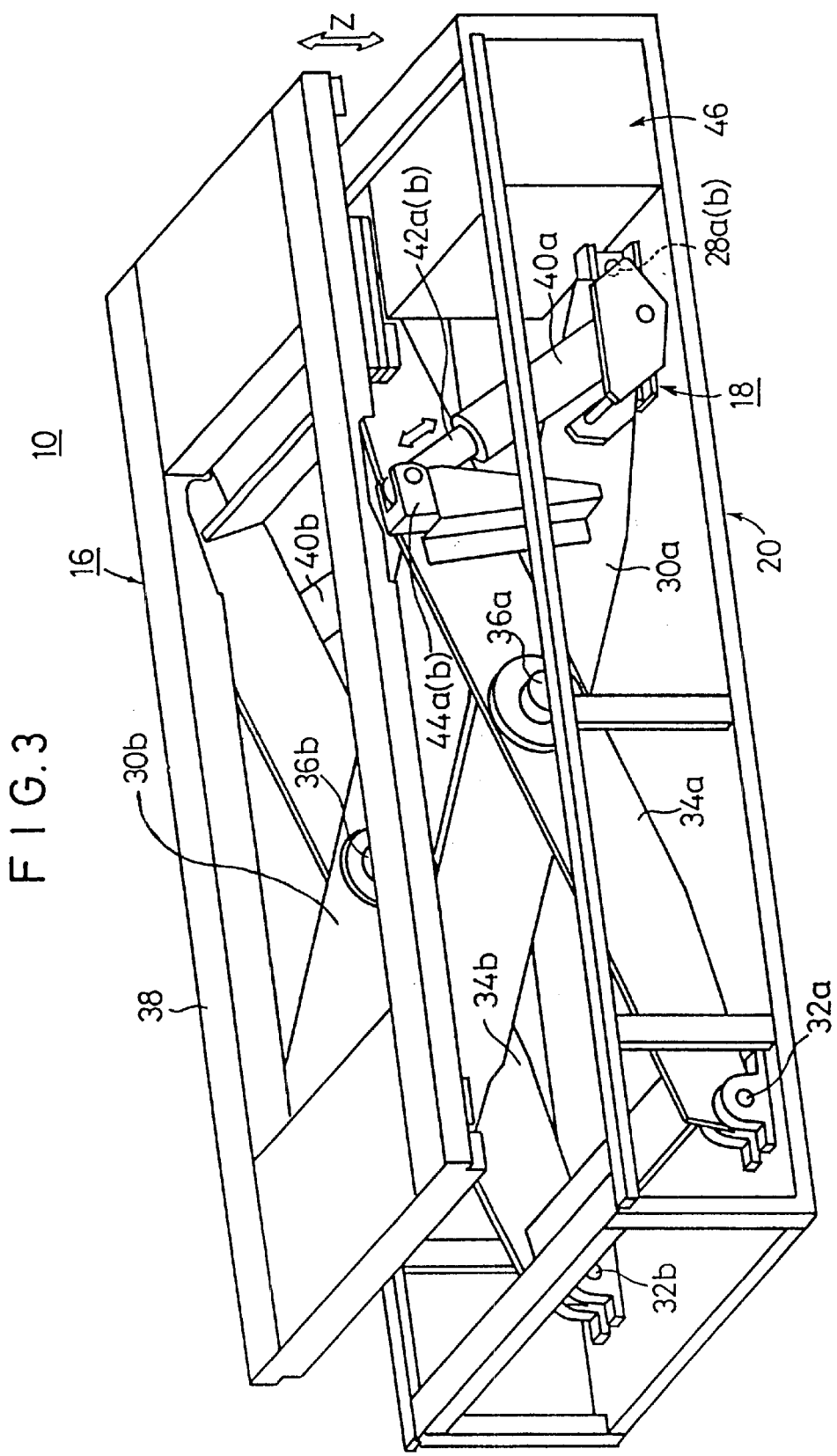
FIG. 3 is a perspective view of an internal structure of a first casing and an imaging bed of the radiation image pickup apparatus.

As shown in FIGS. 2 and 3, the lifting/lowering mechanism 18 comprises a pair of horizontally spaced first swing arms 30a, 30b swingably supported on one end of the first casing 20 remote from the second casing 22 by respective pivot shafts 28a, 28b, and a pair of horizontally spaced second swing arms 34a, 34b swingably supported on the opposite end of the first casing 20 close to the second casing 22 by respective pivot shafts 32a, 32b. The first and second swing arms 30a, 3aa and the first and second swing arms 30b, 34b are coupled to each other by respective joint shafts 36a, 36b at substantially central regions thereof.

The first swing arms 30a, 30b and the second swing arms 34a, 34b have respective distal ends held in operative engagement with the bottom of a vertically movable base 38 of the imaging bed 16.

Hydraulic cylinders 40*a*, 40*b* are mounted respectively on the first swing arms 30*a*, 30*b* near the pivot shafts 28*a*, 28*b* and have respective rods 42*a*, 42*b* extending toward and coupled to the second swing arms 34*a*, 34*b*, respectively, by attachments 44*a*, 44*b* near upper ends of the second swing arms 34*a*, 34*b*. The hydraulic cylinders 40*a*, 40*b* are controlled by a hydraulic unit 46 mounted in the first casing 14. The hydraulic unit 46 has a pump and valves for controlling the flow of a fluid to and from the hydraulic cylinders 40*a*, 40*b*.

Figure 4:
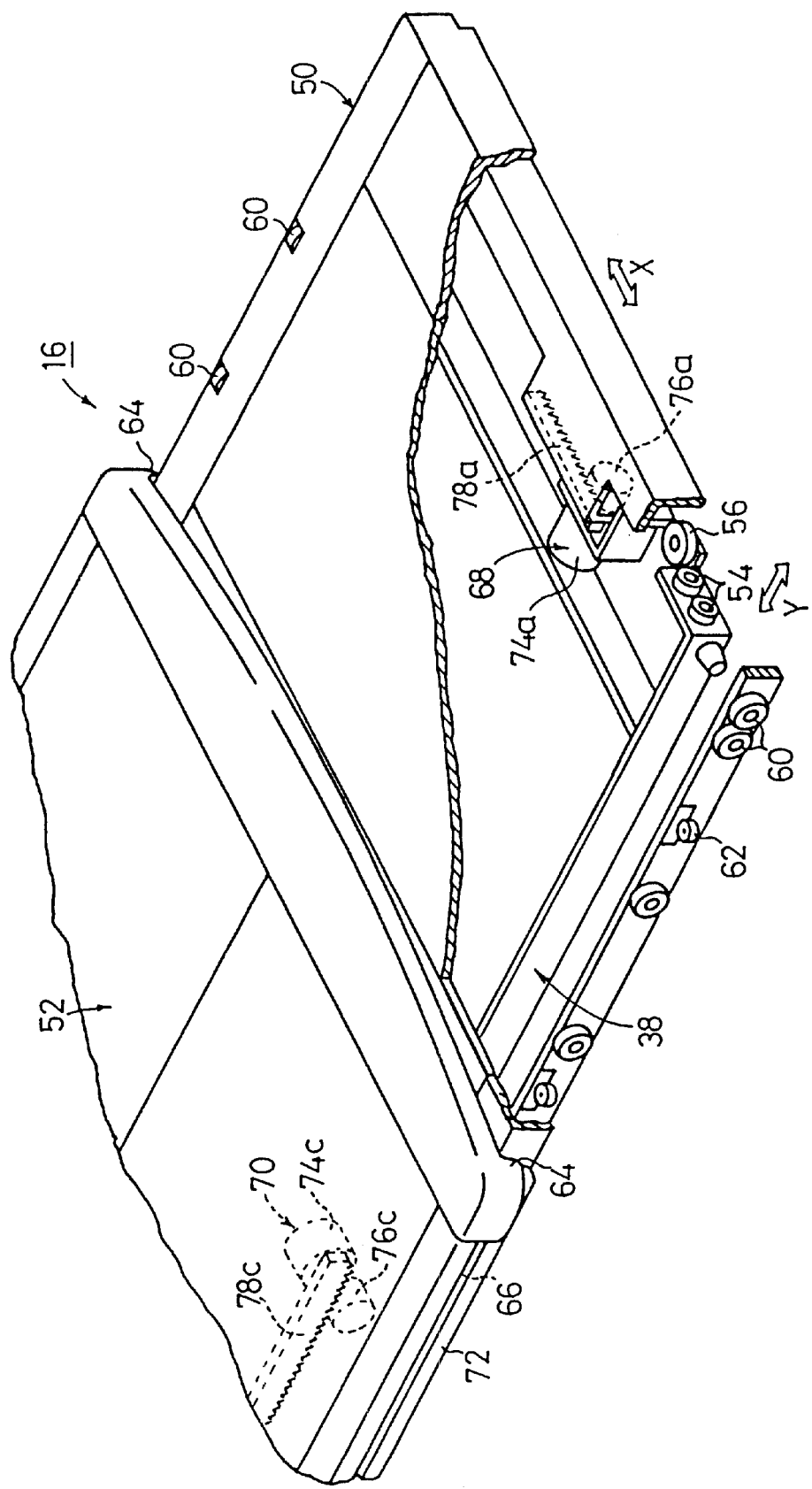
FIG. 4 is a fragmentary perspective view, partly broken away, of the imaging bed.

As shown in FIG. 1, a dust-resistant, light-shielding bellows 48 which is vertically expandable and contractible is disposed between and connected to the vertically movable base 38 and the first casing 20. As shown in FIG. 4, a movable table 50 that can be displaced in the transverse directions of the first casing 20 indicated by the arrow X is mounted on the vertically movable base 38, and a top panel 52 movable in the longitudinal directions indicated by the arrow Y is mounted on the movable table 50.

A plurality of rollers 54 rotatable about respective horizontal axes and a guide roller 56 rotatable about a vertical axis are mounted on each of the opposite ends of the vertically movable base 38 in the directions indicated by the arrow Y. The movable table 50 is in the form of a frame having, on each of its opposite ends, a guide 58 of channel-shaped cross section in which the rollers 54 and the guide roller 56 are rollingly supported. A plurality of rollers 60 rotatable about respective horizontal axes and a plurality of guide rollers 62 rotatable about respective vertical axes are mounted on each of the opposite ends of the movable table 50 in the directions indicated by the arrow X.

The top panel 52 has a pair of guides 64 of channel-shaped cross section on the respective ends thereof in the directions indicated by the arrow X, and the rollers 60 and the guide rollers 62 are rollingly supported in the guides 64. Two linear touch switches 66 are fixed to the respective ends of the top panel 52 along the respective guides 64. The touch switches 66 are used to turn on and off first and second lock units 68, 70 which lock the movable table 50 and the top panel 52. While one of the touch switches 66 is being pressed, the first and second lock units 68, 70 unlock the movable table 50 and the top panel 52.

Figure 5:
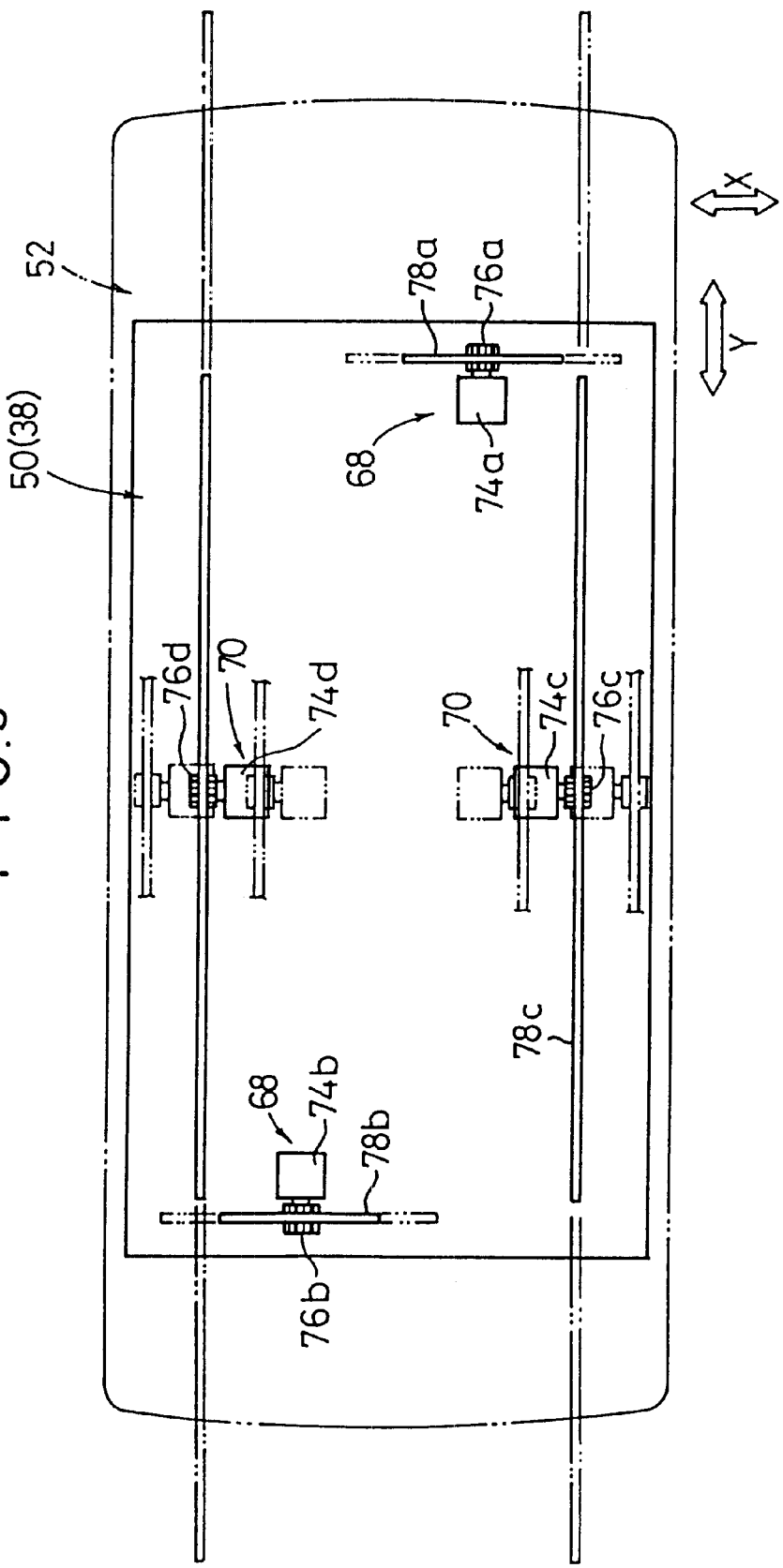
FIG. 5 is a plan view of first and second lock units of the imaging bed.

As shown in FIGS. 4 and 5, the first lock unit 68 comprises a pair of electromagnetic brakes 74*a*, 74*b* fixedly positioned at the opposite ends of the vertically movable base 38 in the directions indicated by the arrow Y in point symmetry relationship to each other, a pair of pinion gears 76*a*, 76*b* secured to the respective electromagnetic brakes 74*a*, 74*b*, and a pair of racks 78*a*, 78*b* extending in the directions indicated by the arrow X and fixed to the movable table 50, the racks 78*a*, 78*b* being held in mesh with the pinion gears 76*a*, 76*b*. The second lock unit 70 comprises a pair of electromagnetic brakes 74*c*, 74*d* fixedly positioned at the opposite ends of the movable table 50 in the directions indicated by the arrow X in symmetrical relationship to each other, a pair of pinion gears 76*c*, 76*d* secured to the respective electromagnetic brakes 74*c*, 74*d*, and a pair of racks 78*c*, 78*d* extending in the directions indicated by the arrow Y and fixed to the top plate 52, the racks 78*c*, 78*d* being held in mesh with the pinion gears 76*c*, 76*d*.

Figure 6:
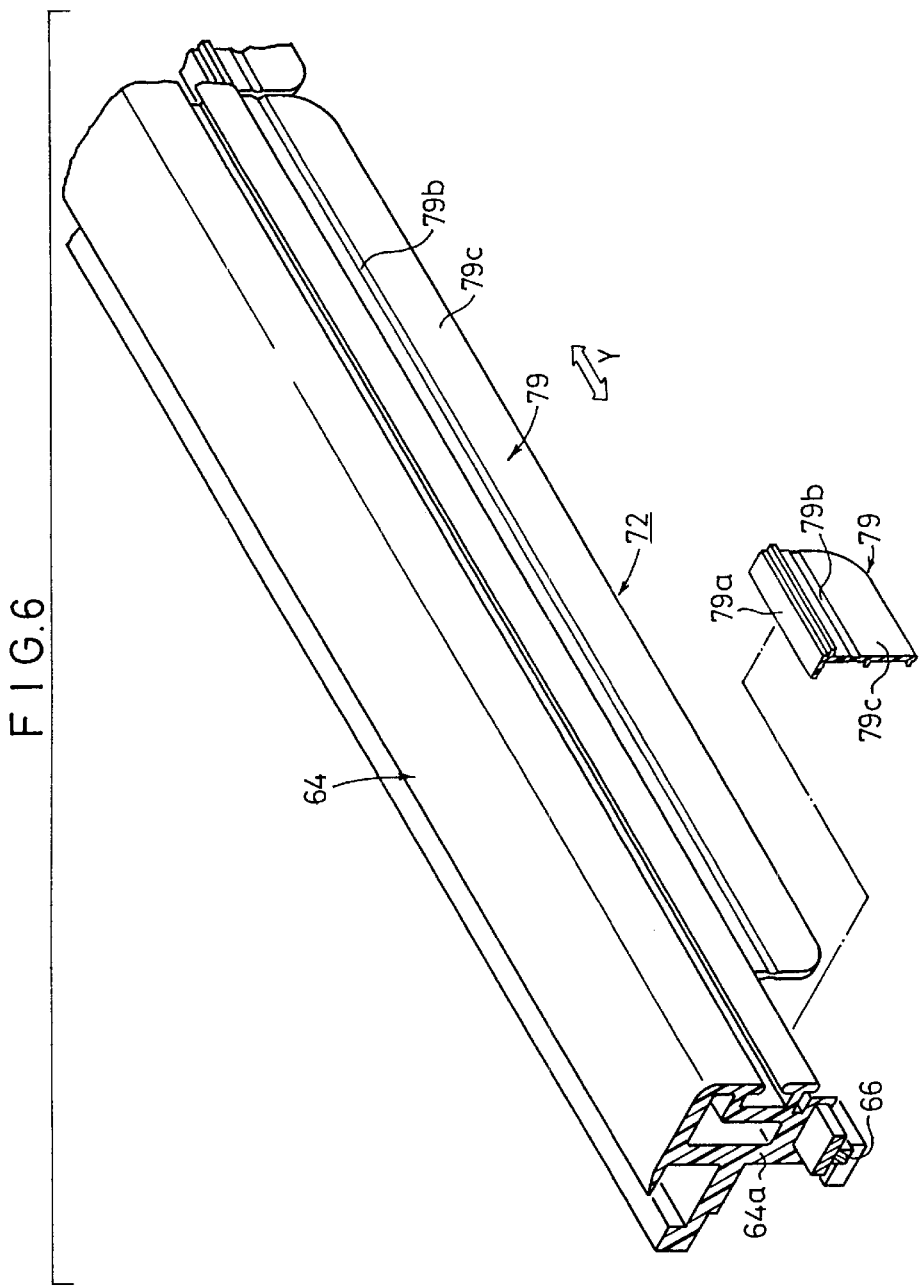
FIG. 6 is a fragmentary exploded perspective view of a touch switch and a protective cover.
Figure 7:
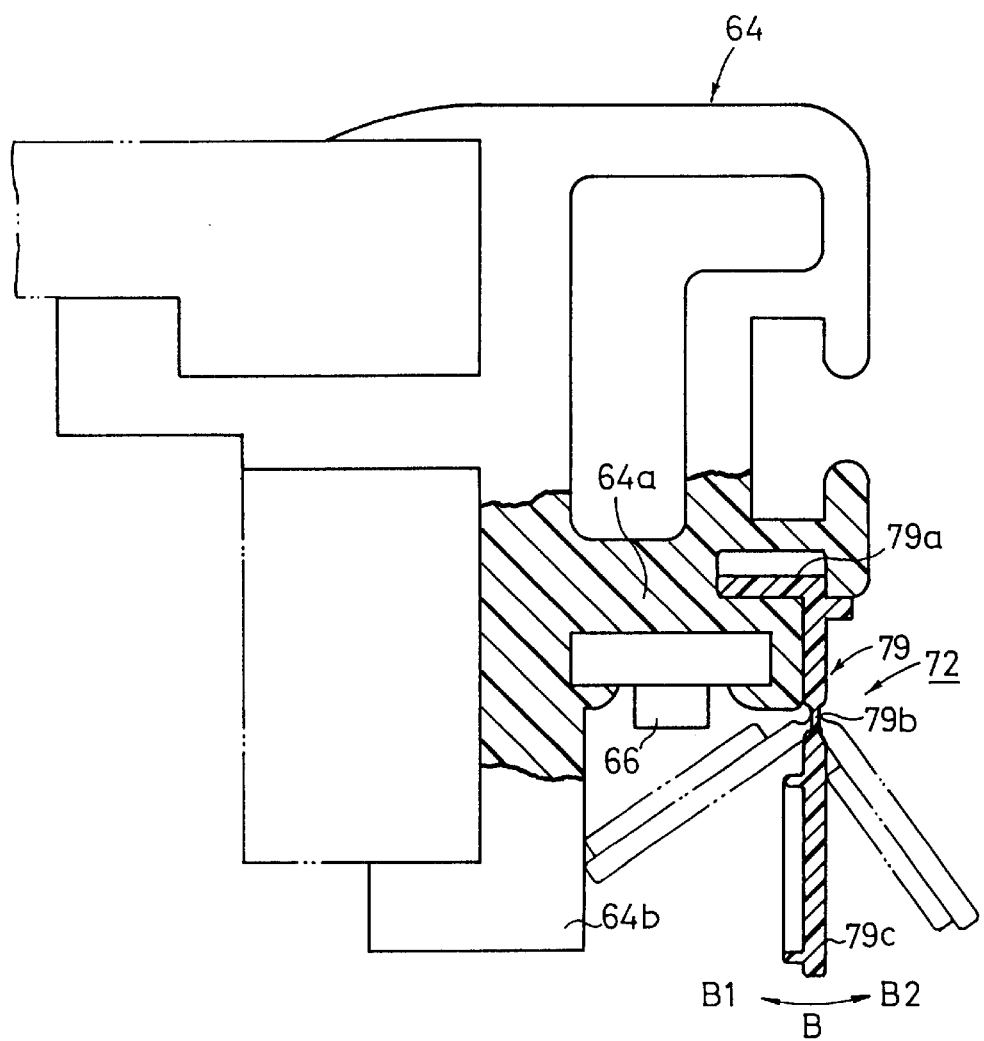
FIG. 7 is an elevational view, partly in cross section, of the touch switch and the protective cover.

As shown in FIGS. 6 and 7, each of the guides 64 has a horizontally projecting attachment web 64*a* and a stopper 64*b* extending substantially perpendicularly to the attachment web 64*a*. The linear touch switch 66 extending longitudinally of the top panel 52 (in the direction indicated by the arrow Y) is fixed to a lower surface of the attachment web 64*a*.

A protective cover 72 that is combined with each of the touch switches 66 comprises a plurality of cover members 79 each of a predetermined length which are separate along the touch switch 66 (in the direction indicated by the arrow Y). The cover members 79 are arrayed and fixed to the attachment web 64*a*. Each of the cover members 79 is made of an elastomeric synthetic resin, and has a fixed panel 79*a* of L-shaped cross section fixedly disposed on the attachment web 64*a*, a hinge 79*b* of reduced thickness integrally joined to the lower end of the fixed panel 79*a*, and a tiltable panel 79*c* of predetermined length projecting downwardly from and integrally formed with the lower end of the hinge 79*b* and tiltable back and forth in the directions indicated by the arrow B, i.e., the arrows B1, B2, in FIG. 7.

When the panel 79*c* is tilted toward the touch switch 66 in the direction indicated by the arrow B1, the panel 79*c* covers the touch switch 66 and engages the stopper 64*b*, preventing fingers from touching the touch switch 66, as shown in FIG. 7.

As shown in FIG. 2, the vertically movable base 38 supports therein a recording unit 80 for temporarily recording radiation image information of a subject on a stimulable phosphor sheet S. The housing 14 houses therein a reading unit 82 for photoelectrically reading the radiation image information recorded on the stimulable phosphor sheet S by applying a laser beam L as simulating light to the stimulable phosphor sheet S, an erasing assembly 84 for erasing remaining radiation image information from the stimulable phosphor sheet S after the recorded image information has been read, and a circulating feed system 86 for circulating three stimulable phosphor sheets S, for example, in the image information reading apparatus 10.

Figure 8:
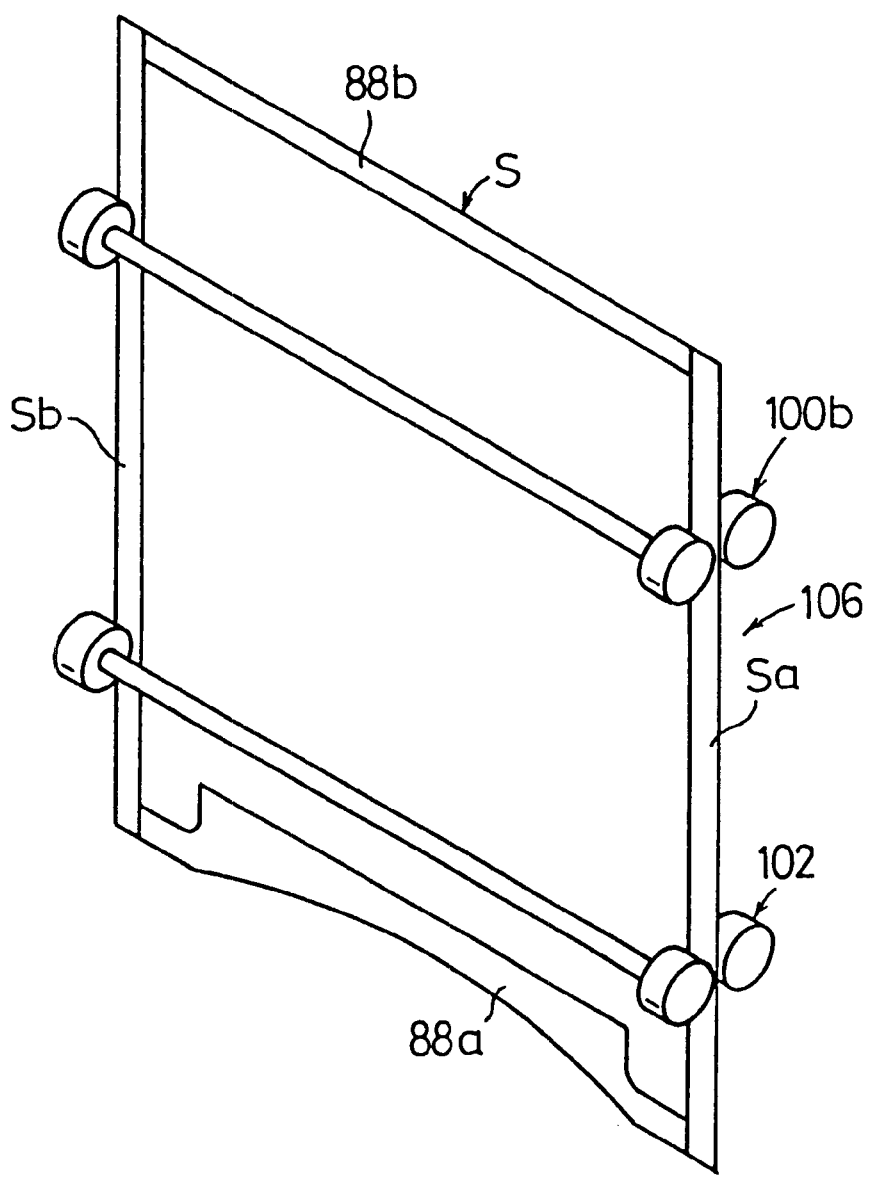
FIG. 8 is a perspective view of a stimulable phosphor sheet.
Figure 9:
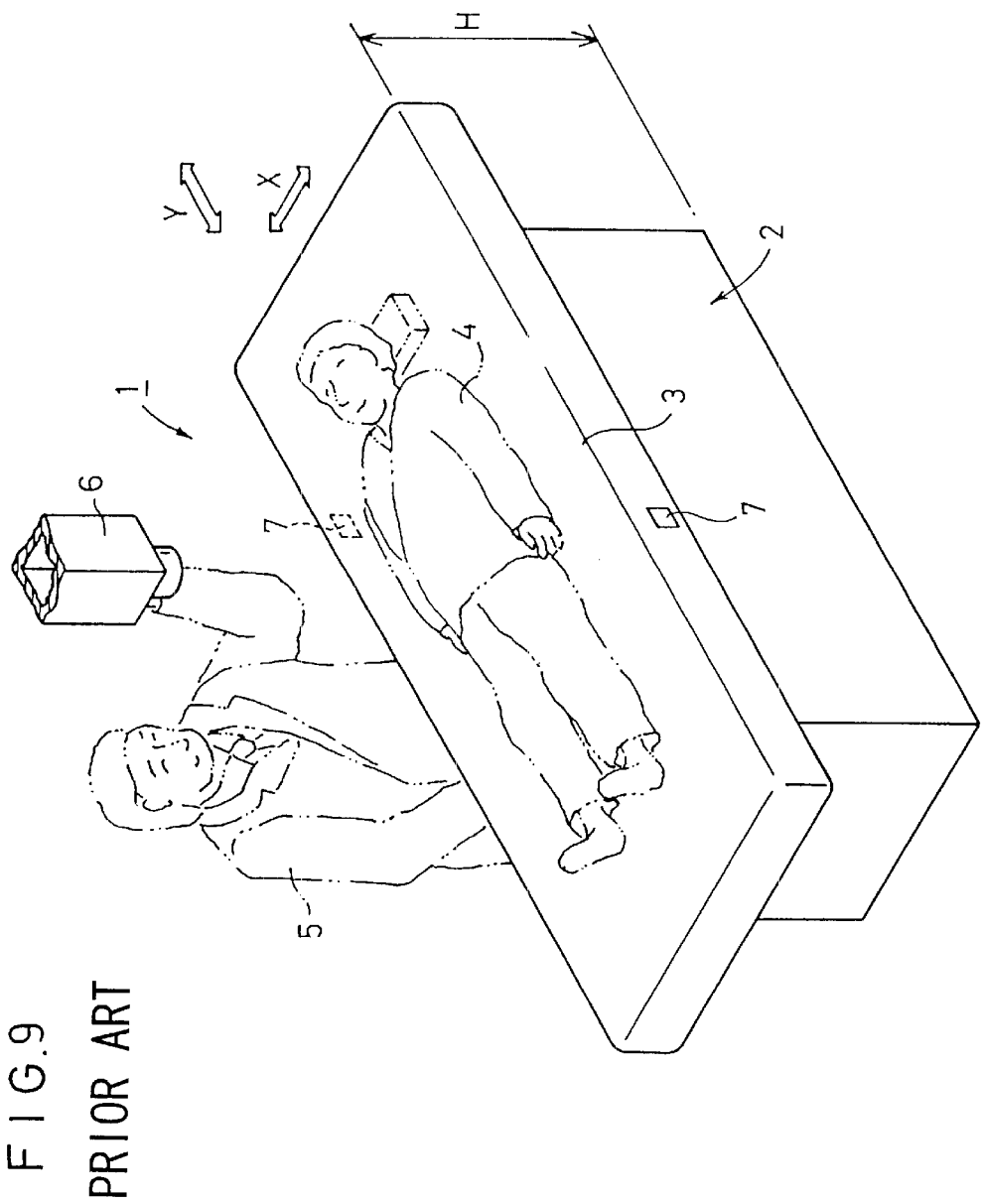
FIG. 9 is a perspective view of a conventional radiation image information reading apparatus.

As shown in FIG. 8, the stimulable phosphor sheet S is gripped only at its opposite marginal edges Sa, Sb when it is fed in circulation. Reinforcing plates 88*a*, 88*b* are fixed to the reverse side of the stimulable phosphor sheet S.

As shown in FIG. 2, the recording unit 80 has a positioning member 90 for positioning the stimulable phosphor sheet S, and a holder plate 94 swingable about a pivot 92 for holding the stimulable phosphor sheet S in position in the recording unit 80. The circulating feed system 86 has a roller pair 100*a* disposed near an inlet/outlet end of the recording unit 80 remote from the positioning member 90, and a roller pair 100*b* spaced a given distance from the roller pair 100*a*. The roller pairs 100*a*, 100*b* are supported on the vertically movable base 38 for vertical movement in unison with the vertically movable base 38.

The circulating feed system 86 also has a plurality of roller pairs 102 disposed in the first casing 20. The second casing 22 houses therein a roller pair 104 which is independent of the circulating feed system 86. The roller pairs 100*a*, 100*b*, 102, 104 grip only the marginal edges Sa, Sb of the stimulable phosphor sheet S to feed the stimulable phosphor sheet S.

The circulating feed system 86 comprises a vertical feed path 106 extending vertically downwardly from the recording unit 80, a horizontal feed path 108 extending horizontally from the lower end of the vertical feed path 106 to the roller pair 104, an inclined feed path 110 turning 180° back from the roller pair 104 and extending through the reading unit 82 to a position beyond the erasing assembly 84, and a switchback feed path 112 turning 180° back from the tip end of the inclined feed path 110 for sheet switchback and joined to the vertical feed path 106. The circulating feed system 86 includes a reversible roller pair 114 disposed at the switchback feed path 112.

Three stimulable phosphor sheets S are present in the circulating feed system 86 at all times. These stimulable phosphor sheets S can be placed in three standby positions including a first standby position ST1 as a set position in the recording unit 80, a second standby position ST2 disposed in the horizontal feed path 108, and a third standby position ST3 disposed in the erasing assembly 84.

The reading unit 82 is positioned in the second casing 22. The reading unit 82 comprises an auxiliary scanning feed assembly 120 for feeding a stimulable phosphor sheet S in an auxiliary scanning direction which is a horizontal direction indicated by the arrow A, a laser beam radiating device 122 for applying a laser beam L as stimulating light substantially vertically to the stimulable phosphor sheet S as it is fed in the auxiliary scanning direction to scan the stimulable phosphor sheet S in a main scanning direction which is normal to the auxiliary scanning direction, and first and second light collecting systems 124, 126 for photoelectrically reading light that is emitted from the stimulable phosphor sheet S upon application of the laser beam L.

The auxiliary scanning feed assembly 120 has first and second roller pairs 128, 130 that are rotatable in synchronism with each other. The first light collecting system 124 comprises a first light guide 132a having an end which is disposed at a position where the laser beam L is applied to a recording surface of the stimulable phosphor sheet S and extends in the main scanning direction, and a first photomultiplier 13aa mounted on the other end of the first light guide 132a. The second light collecting system 126 comprises a second light guide 132b having an end which is disposed on the side of the reverse surface of the stimulable phosphor sheet S and extends in the main scanning direction, and a second photomultiplier 134b mounted on the other end of the second light guide 132b.

The erasing assembly 84 comprises a first erasing unit 140a disposed over the recording surface of the stimulable phosphor sheet S and a second erasing unit 140b disposed over the reverse surface of the stimulable phosphor sheet S. The first and second erasing units 140a, 140b have respective erasing light sources 142a, 142b.

As shown in FIG. 1, the controller 24 has a control panel 154 which has a plurality of lamps 150, a display panel 152, and a plurality of lamps 153 for indicating a recording size with selector keys. When the controller 24 is turned on by the operator who operates a console (not shown) or a recording size is selected, the lamps 150, 153 indicate such turn-on and recording size information, and the display unit 152 displays the ID number and name of a patient registered via the console or a recording menu.

The switch unit 26 has a first foot switch 160 for unlocking the top panel 52 of the imaging bed 16 for horizontal movement thereof, a second foot switch 162 for lowering the imaging bed 16, a third foot switch 164 for lifting the imaging bed 16, and a fourth foot switch 166 for stopping the imaging bed 16 against vertical movement in case of emergency. The fourth foot switch 166 has a pedal cover 168. When a release button 170 in the pedal cover 168 is manually turned in a predetermined direction, the imaging bed 16 is allowed to move vertically.

An X-ray radiating unit 172 is positioned over the top panel 52.

Operation of the image information reading apparatus 10 thus constructed will be described below.

An ID card carrying ID information of a patient, including an ID number and a name, is prepared, and read by the console. The console selects an imaging area, such as a chest or an abdomen, of the patient, and a recording menu. Then, a recording size is selected, if necessary. Then, the patient as a subject to be imaged is placed on the imaging bed 16.

At this time, the vertical position of the imaging bed 16 in the direction indicated by arrow Z is adjusted depending on the condition of the patient, the height of the patient, and the carriage, such as a wheelchair, a stretcher, or the like, by which the patient has been carried. Specifically, the operator presses the second foot switch 162 to cause the hydraulic unit 46 of the lifting/lowering mechanism 18 to operate the hydraulic cylinders 40a, 40b (see FIG. 3). The rods 42a, 42b of the hydraulic cylinders 40a, 40b are retracted to swing the second swing arms 34a, 34b, which are coupled to the rods 42a, 42b by the attachment 44a, 44b, downwardly about the pivot shafts 32a, 32b.

Since the first swing arms 30a, 30b are coupled to the second swing arms 34a, 34b by the joint shafts 36a, 36b, when the second swing arms 34a, 34b are turned downwardly, the first swing arms 30a, 30b are angularly moved downwardly about the pivot shafts 28a, 28b. Therefore, the vertically movable base 38 is moved downwardly to lower the imaging bed 16.

When the operator presses the third foot switch 164, the hydraulic unit 46 actuates the hydraulic cylinders 40a, 40b in the opposite direction. Therefore, the vertically movable base 38 supported by the first swing arms 30a, 30b and the second swing arms 34a, 34b is elevated, thus lifting the imaging bed 16.

In this manner, the imaging bed 16 is adjusted to a vertical position where the patient can easily be placed onto the top panel 52. After the patient is placed on the top panel 52 with the back or one side down, the operator selectively presses the second foot switch 162 or the third foot switch 164 to adjust the vertical position of the top panel 52 for easy subsequent imaging operation. The operator further presses the first foot switch 160 or continuously turns on one of the touch switches 66 on the top panel 52 to energize the electromagnetic brakes 7aa–74d of the first and second lock units 68, 70, thereby making the pinion gears 76a–76d free to rotate. The movable table 50 and the top panel 52 are now unlocked.

With the touch switch 66 being continuously pressed, the operator slides the top panel 52 in the directions indicated by the arrows X, Y to adjust the position of the patient until the imaging area of the patient enters a radiating range of the X-ray radiating unit 172. After the imaging area of the patient is positioned, the operator releases the touch switch 66 to de-energize the electromagnetic brakes 74a–74d, whereupon the movable table 50 and the top panel 52 are locked.

The X-ray radiating unit 172 is then energized to record radiation image information of the patient on a stimulable phosphor sheet S in the recording unit 80. At this time, the other two stimulable phosphor sheets S are placed in the second and third standby positions ST2, ST3, respectively.

When the roller pair 100a of the circulating feed system 86 is rotated, the stimulable phosphor sheet S which has recorded the radiation image information is gripped at its marginal edges Sa, Sb by the roller pair 100a and removed from the recording unit 80. The stimulable phosphor sheet S is then gripped by the roller pairs 100b, 102 and transferred from the vertical feed path 106 into the horizontal feed path 108 (see FIG. 8). Then, the stimulable phosphor sheet S is fed from the first casing 20 into the second casing 22 by the roller pairs 102, and turned 180° above the horizontal feed path 108 by the roller pair 104 and fed into the auxiliary scanning feed assembly 120 of the reading unit 82.

In the auxiliary scanning feed assembly 120, the first and second roller pairs 128, 130 are synchronously rotated by a motor (not shown). The stimulable phosphor sheet S is gripped at its marginal edges Sa, Sb by the first and second roller pairs 128, 130 and fed in the auxiliary scanning direction indicated by the arrow A. At this time, the laser beam L is emitted from the laser beam radiating device 122 and applied to the recording surface of the stimulable phosphor sheet S to scan the stimulable phosphor sheet S in the main scanning direction.

When irradiated by the laser beam L, the recording surface of the stimulable phosphor sheet S emits light which represents the recorded radiation image information. The emitted light is photoelectrically read by the first light collecting system 124. Light that has passed through a transparent base of the stimulable phosphor sheet S is emitted from the reverse surface thereof, and photoelectrically read by the second light collecting system 126.

The stimulable phosphor sheet S, from which the recorded radiation image information has been read, is fed from the second casing 22 back into the first casing 20, and delivered along the inclined feed path 110 into the erasing assembly 84. In the erasing assembly 84, the erasing light sources 142a, 142b of the first and second erasing units 140a, 140b apply erasing light to the both surfaces of the stimulable phosphor sheet S to erase unwanted remaining radiation image information from the stimulable phosphor sheet S.

After the remaining radiation image information has been erased from the stimulable phosphor sheet S, the stimulable phosphor sheet S is turned 180° below the inclined feed path 110 and delivered into the switchback feed path 112. The roller pair 114 on the switchback feed path 112 is reversed to feed the stimulable phosphor sheet S from the switchback feed path 112 into the vertical feed path 106, along which the stimulable phosphor sheet S is delivered by the roller pairs 100a, 100b into the recording unit 80.

In the present embodiment, the linear touch switches 66 are fixed to the respective ends of the top panel 52 along the respective guides 64 in the longitudinal direction indicated by the arrow Y. The protective covers 72 are positioned outwardly of the respective touch switches 66 and tiltable toward the top panel 52.

For releasing the top panel 52 from the first and second lock units 68, 70, the operator tilts the panel 79c of a desired one of the cover members 79 toward the operator, i.e., in the direction indicated by the arrow B2 (see FIG. 7). Then, the operator continuously presses the touch switch 66 from below the panel 79c, allowing the top panel 52 to move freely in the directions indicated by the arrows X, Y. Thus, the operator can operate the touch switch 66 in any position alongside of the top panel 52, and hence can operate the top panel 52 efficiently.

When the patient climbs on or off the top panel 52, a finger or fingers of the patient may possibly touch the protective cover 72. When a finger or fingers of the patient touch the panel 79c, the panel 79c is tilted toward the touch switch 66 in the direction indicated by the arrow B1 about the hinge 79b. The panel 79c is brought into contact with the stopper 64b of the guide 64 in covering relation to the touch switch 66, thus protecting the touch switch 66.

Consequently, the touch switch 66 is reliably prevented from being inadvertently touched or pressed by a finger or fingers of the patient.

As described above, the touch switches 66 are disposed on the opposite ends of the top panel 66 and extend in the directions indicated by the arrow Y. When the operator is continuously pressing the touch switches 66, the imaging area of the patient on the top panel 52 can easily and quickly be adjusted into alignment with the X-ray radiating unit 172. Inasmuch as the protective cover 72 prevents the patient from inadvertently touching or pressing the touch switches 66, the top panel 52 does not move undesirably when the patient climbs on and off the top panel 52.

The protective cover 72 comprises the cover members 79 each of a predetermined length which are separate along the touch switch 66. The operator can tilt a desired one of the cover members 79 in the direction indicated by the arrow B2 for easily pressing the touch switch 66. Therefore, the operator finds it efficient to operate the imaging bed 16.

Each of the cover members 79 is molded of a synthetic resin, with the hinge 79b integrally formed therewith. The protective cover 72 can thus be manufactured at a reduced cost and hence is economical.

In the illustrated embodiment, the present invention has been described with respect to the radiation image information reading apparatus 10 for recording radiation image information on a stimulable phosphor sheet. However, the principles of the present invention are also applicable to an apparatus for recording an X-ray image directly on an X-ray photographic film.

As described above, the lock unit for locking the top panel with the patient placed thereon in any desired position can be turned on or off by the touch switches mounted on the top panel, and the tiltable protective cover is positioned outwardly of each of the touch switches. The touch switches allow the operator to unlock the top panel easily for operating the top panel efficiently. The protective cover reliably prevents the patient from inadvertently touching or pressing the touch switches. Consequently, the imaging bed is protected from an unwanted release from a fixed position, and can efficiently be operated.

Although a certain preferred embodiment of the present invention has been shown and described in detail, it should be understood that various changes and modifications may be made therein without departing from the scope of the appended claims.

What is claimed is:

1. A radiation image pickup apparatus comprising:
   an imaging bed having a recording unit for capturing a radiation image of a subject;
   said imaging bed having
      a base;
      a top panel for placing the subject thereon, said top panel being movable horizontally with respect to said base;
      a lock mechanism which locks said top panel in a selected position;
      a switch mounted on said top panel for unlocking said top panel from said lock means; and
      a protective cover positioned outwardly of said switch and tiltable about a hinge portion between (1) a closed position in which said protective cover engages with said top panel and covers said switch, and (2) an opened position in which said protective cover is swung away from said top panel,
   wherein said hinge portion influences said protective cover toward an intermediate position that is located between the closed and the opened positions.

2. A radiation image pickup apparatus according to claim 1, wherein said switch comprises a linear switch extending along a side of said top panel, and said protective cover comprises a plurality of cover members each of a predetermined length which are separate along said linear switch.

3. A radiation image pickup apparatus according to claim 1, wherein said protective cover is molded of a synthetic resin and has an integral hinged structure.

4. A radiation image pickup apparatus according to claim 3, wherein said switch comprises a linear switch extending along a side of said top panel, and said protective cover comprises a plurality of cover members each of a predetermined length which are separate along said linear switch.

5. A radiation image pickup apparatus according to claim 4, wherein each of said cover members comprises:
- a fixed panel fixed to said top panel;
- a hinge of reduced thickness integrally joined to a lower end of said fixed panel, providing said integral hinged structure; and
- a tiltable panel integrally formed with a lower end of said hinge.

6. A radiation image pickup apparatus comprising:
- an imaging bed having a recording unit for capturing a radiation image of a subject;
- said imaging bed having
  - (1) a base;
  - (2) a top panel for placing the subject thereon, said top panel being movable horizontally with respect to said base;
  - (3) lock means for locking said top panel in a selected position;
  - (4) a switch mounted on said top panel for unlocking said top panel from said lock means; and
  - (5) a protective cover positioned outwardly of said switch and tiltable toward and away from said top panel, said protective cover being engageable with said top panel in covering relation to said switch for preventing a finger from touching said switch when said protective cover is tilted toward said switch under external forces,
  - wherein said switch comprises a linear switch extending along a side of said top panel, and said protective cover comprises a plurality of cover members each of a predetermined length which are separate along said linear switch.

7. A radiation image pickup apparatus comprising:
- an imaging bed having a recording unit for capturing a radiation image of a subject;
- said imaging bed having
  - (1) a base;
  - (2) a top panel for placing the subject thereon, said top panel being movable horizontally with respect to said base;
  - (3) lock means for locking said top panel in a selected position;
  - (4) a switch mounted on said top panel for unlocking said top panel from said lock means; and
  - (5) a protective cover positioned outwardly of said switch and tiltable toward and away from said top panel, said protective cover being engageable with said top panel in covering relation to said switch for preventing a finger from touching said switch when said protective cover is tilted toward said switch under external forces,
  - wherein said protective cover is molded of a synthetic resin and has an integral hinged structure,
  - wherein said switch comprises a linear switch extending along a side of said top panel, and said protective cover comprises a plurality of cover members each of a predetermined length which are separate along said linear switch.

8. A radiation image pickup apparatus according to claim 7, wherein each of said cover members comprises:
- a fixed panel fixed to said top panel;
- a hinge of reduced thickness integrally joined to a lower end of said fixed panel, providing said integral hinged structure; and
- a tiltable panel integrally formed with a lower end of said hinge.

* * * * *